(12) United States Patent
Young et al.

(10) Patent No.: US 9,916,350 B2
(45) Date of Patent: *Mar. 13, 2018

(54) AUTOMATED CREATION OF JOIN GRAPHS FOR UNRELATED DATA SETS AMONG RELATIONAL DATABASES

(71) Applicant: ATTIVIO, INC., Newton, MA (US)

(72) Inventors: Jonathan Young, Newton, MA (US); John O'Neil, Watertown, MA (US); William K. Johnson, III, Natick, MA (US); Martin Serrano, Andover, MA (US); Gregory George, Sudbury, MA (US); Udayan Das, Brookline, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/362,806

(22) Filed: Nov. 28, 2016

(65) Prior Publication Data

US 2017/0193045 A1      Jul. 6, 2017

Related U.S. Application Data

(63) Continuation of application No. 14/834,430, filed on Aug. 24, 2015, now Pat. No. 9,507,824, which is a
(Continued)

(51) Int. Cl.
  *G06F 17/30*      (2006.01)
(52) U.S. Cl.
  CPC .. *G06F 17/30454* (2013.01); *G06F 17/30339* (2013.01); *G06F 17/30498* (2013.01); *G06F 17/30958* (2013.01)

(58) Field of Classification Search
  CPC ......... G06F 17/30498; G06F 17/30474; G06F 17/30958; G06F 17/30448; G06F 17/30466; G06F 17/30327
  See application file for complete search history.

(56) References Cited

U.S. PATENT DOCUMENTS 5,701,460 A * 12/1997 Kaplan ............. G06F 17/30436
                                              707/748
9,507,824 B2 * 11/2016 Young ............... G06F 17/30454
                                              707/748
(Continued)

OTHER PUBLICATIONS

Acar et al. "Efficient Discovery of Join Plans in Schemaless Data", ACM 2009.*

*Primary Examiner* — Carol Choi
(74) *Attorney, Agent, or Firm* — Patent GC; Alexander Franco

(57) ABSTRACT

A computer system processes a plurality of unrelated database tables to create a join graph where each node in the join graph represents a table. The nodes in the join graph are connected by weighted, directed edges, where each directed edge represents a join from a first column in a first table to a second column in a second table and where the weight of the directed edge represents a predicted level of success in performing the join. The edge weights can be based on a likelihood of finding a value from the first column in the second column. A user selects a subset of the tables, and the system creates a join tree with recommended joins between the tables selected by the user. The recommended joins are used to create a structured query language statement which is executed to return a result to the user.

20 Claims, 9 Drawing Sheets

Related U.S. Application Data continuation of application No. PCT/US2015/046615, filed on Aug. 24, 2015, and a continuation-in-part of application No. 14/466,231, filed on Aug. 22, 2014.

(56) References Cited

U.S. PATENT DOCUMENTS

| | | | |
|---|---|---|---|
| 2004/0260675 A1* | 12/2004 | Bruno | G06F 17/30333 707/999.002 |
| 2013/0311443 A1* | 11/2013 | Bolotnikoff | G06F 17/30448 707/714 |
| 2014/0149388 A1* | 5/2014 | Gruszecki | G06F 17/30469 707/714 |

* cited by examiner

AUTOMATED CREATION OF JOIN GRAPHS FOR UNRELATED DATA SETS AMONG RELATIONAL DATABASES

RELATED APPLICATIONS

This application is a continuation of U.S. application Ser. No. 14/834,430, filed 24 Aug. 2015 (U.S. Pat. No. 9,507,824), which is a continuation of PCT application PCT/US15/46615, filed 24 Aug. 2015, which claims priority to U.S. application Ser. No. 14/466,231, filed 22 Aug. 2014, all of which applications are hereby incorporated by reference.

BACKGROUND

In large data sets with multiple tables of information, an operation called a "join" is commonly performed to generate reports in response to queries.

For example, a table of data about people may include an entry (or row) for each person (such as each employee of a company). Each entry includes data in fields (or columns), where that data represents the person. For example, the table can have an identifier field (or column) for each entry, which stores a value which should be unique for each person. Similarly, a table of data about locations may include an entry (or row) for each location (such as each office for a company). Each entry includes data in fields (or columns), where that data represents the location, such as address data. The table also can have an identifier field (or column) for each entry which stores a value which should be unique for each location. Another table may include associations between people and locations. Each entry in this table provides at least the identifier of the person and the identifier of the location to which that person is assigned.

Without joining tables, generating a report listing employees and their addresses would involve accessing each of these three tables to obtain all of the information for the report. Joining involves combining the data from among the tables into another data set that can be processed as a combined table. For example, a possible result of joining the three tables above would be a single table with an entry for each person, including their names, identifiers, office identifiers and office addresses. How the tables are combined can be described as an inner join or outer (left or right) join.

Joining database tables is generally easy if the database tables are all designed by the same person or team of people, and the designs are coordinated. Joining tables also is generally easy if different tables still have the same field names and data types for fields that store the same data, such as the identifiers in the example above. Joining tables becomes more complex when the tables arise from separate and distinct databases with different table structures without any design coordination, often called "silos". Joining tables also is more complex if the data sets are arbitrary and generated from unstructured data.

SUMMARY

This Summary is provided to introduce a selection of concepts in a simplified form that are further described below in the Detailed Description. This Summary is intended neither to identify key or essential features, nor to limit the scope, of the claimed subject matter.

In accordance with a first embodiment, a computer system processes arbitrary data sets to identify fields of data that can be the basis of a join operation, which in turn can be used in report and query generation. Each data set has a plurality of entries, with each entry having a plurality of fields. Each field can have one or more values, but it is possible for record to be missing a value in the field. Given such data sets, then, for each pair of data sets, the computer system compares the values of fields in a first data set in the pair of data sets to the values of fields in a second data set in the pair of data sets, to identify fields having substantially similar sets of values. Given pairs of fields that have similar sets of values, the computer system measures entropy with respect to an intersection of the sets of values of the identified fields from the pair of data sets. The computer system can perform other statistical analyses on the fields or the multiset intersection of those fields. The computer system can recommend or select fields for a join operation between any pair of data sets in the plurality of data sets, based at least on the measured entropy with respect to the intersection of the sets of values of the identified fields from the pair of data sets and optionally other statistical measures.

In accordance with a second embodiment, a computer system processes a plurality of unrelated database tables to create a join graph wherein each node in the join graph represents a table. The nodes in the join graph are connected by weighted, directed edges, wherein each directed edge represents a join from a first column in a first table to a second column in a second table and wherein the weight of the directed edge represents a predicted level of success in performing the join. The edge weights can be based on a likelihood of finding a value from the first column in the second column. A user selects a subset of the tables and the system creates a join tree with recommended joins between the tables selected by the user. The recommended joins are used to create a structured query language statement which is executed to return a result to the user.

Aspects of the first and second embodiments can be combined in still further embodiments and this disclosure contemplates such combinations.

The invention may be embodied as a computer system, as any individual component of such a computer system, as a process performed by such a computer system or any individual component of such a computer system, or as an article of manufacture including computer storage on which computer program instructions are stored and which, when processed by one or more computers, configure those computers to provide such a computer system or any individual component of such a computer system.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention.

The following section describes an example operating environment of a computer that processes data sets to identify or recommend fields in those data sets that can be the basis for a join operation in accordance with a first embodiment.

Figure 1:
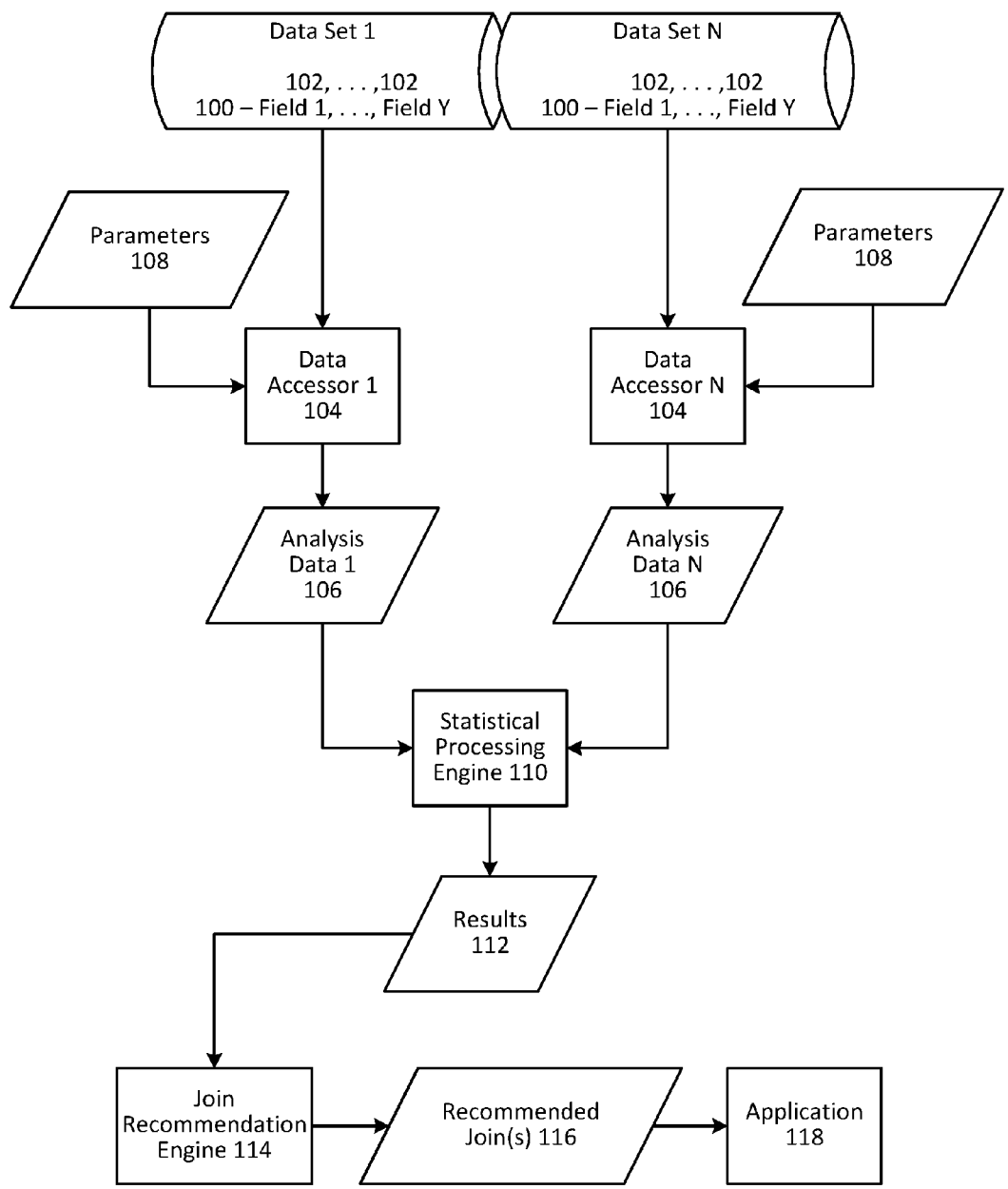
FIG. 1 is a data flow diagram of an example application environment in which a computer system supports discovery and suggestion of joins between arbitrary data sets in accordance with a first embodiment.

Referring to FIG. 1, a plurality of data sets 1 . . . N are shown. A data set also may be called a table or class. Each data set has a plurality of entries 100, which may also be called records, or rows, or objects, with each entry having a plurality of fields 102, which may also be called columns, or attributes, or variables. A field may have a value, or may be empty or have a null value. In some implementations, a data set can have multiple values for a field. For the purposes of finding joins, in general there are at least two fields per data set, and there are at least two data sets.

In general, such data sets are stored in persistent storage, whether in data files accessible through a file system or as a database, typically accessible through a database management system, such as a relational database or object oriented database.

For analysis, to identify fields for joining the data sets, data from data sets are read from persistent storage into memory where they can be accessed more readily by processing units. The structure of such data may be one or more tables in a relational database, one or more objects in an object oriented database, or one or more indexes of structured, semi-structured, or unstructured data. Such an index can be stored in a format such as an inverted index, in which includes, for each field value, a pointer or other reference to each document which contains that field value.

As shown in FIG. 1, one or more computer programs (called herein data accessory 104) cause a computer to perform the function of reading data from data sets 1 . . . N in persistent storage into memory for analysis. A statistical sampling of a data set can be performed to avoid processing the entire data set. Such a computer program uses available constructs for accessing the data from data sets 1 . . . N and generates analysis data 106 in memory.

The analysis data 106 can be structured as one or more ordered data structures, such as an array, list, matrix or the like, in which each value is stored at an indexed location. In general, from each data set, separately accessible analysis data is generated for each field which has been selected for analysis from the data set. The analysis data from a data set can be structured, for example, as a one-to-one mapping of values for or from a field to values in a data structure (e.g., an array), or can be a many-to-one mapping of values from multiple fields to values in a data structure (e.g., a matrix).

In addition to making the data accessible in memory for access by a processor for analysis, the data accessor can perform various data transformations to allow easier comparison of data between different fields. For example, the data accessor may convert a data type of the data from a stored data type (in storage) to an analysis data type (in memory). In practice, the data type of most fields is a string, but some may be integers (signed or unsigned), floating point integers, dates and so on.

The different kinds of variations which can be programmed into a data accessor (depending, for example, on the type of persistent storage, available data sets, data types in the available data sets, and data structures and data types used in analysis data sets) are shown in FIG. 1 as parameters 108. Such an illustration is provided merely to indicate that there are variations to such data accessory that can be different across implementations, and not to suggest that a parameterized implementation is required. Each data accessor 104 can be a custom computer program depending on other requirements of the implementation.

Given analysis data for a pair of data sets, the analysis data can be subjected to various statistical processing to identify fields, if any, which are similar enough to support a join operation between the data sets. One or more computer programs cause a computer to perform such statistical processing, as illustrated in FIG. 1 as statistical processing engine 110. Example implementations of such a statistical processing engine will be provided in more detail below.

The output of the statistical processing engine is one or more statistical results 112. Example implementations of data structures for such statistical results will be described in more detail below. Generally, the statistical results include, for each pair of fields, in addition to an identification of the fields in the pair, a set of values resulting from the statistical analyses performed between the two fields. Such statistical results can include, for example, a measure of similarity of the sets of values in the two fields, a measure of entropy with respect to an intersection of the sets of values of the identified fields, a measure of density of one or both fields or a measure of a likelihood that a value in the identified field in the first data set matches a value in the identified field in the second data set.

The statistical results 112 are input to a recommendation engine 114 which provides, as its output, one or more recommended joins 116, which can be provided to applications 118. Each recommended join is a pair of fields, one field from each data set. The recommendation engine can output a list of such recommended joins. The list of joins can be sorted or unsorted. The recommendation engine 114 or an application 118 can present such a list to a user through a display or other output device, and the user can provide one or more selected joins through an appropriate input device. The application 118 also can use the list to select one or more joins.

A variety of applications can take advantage of a selected join pair. For example, various queries, whether computer generated or user generated, can be applied to the joined data sets. For example, user queries, especially exploratory queries, can be automatically enriched.

As one example, an application can have a graphical user interface that presents a list of field values, each of which can be called a facet. A user can select one or more of the facets, in response to which the application retrieves those documents that match the selected facet. Using automatically selected join fields, additional documents that do not match the facet, but which are automatically joined to one or more of the matching documents, also can be retrieved and made available to the user. Using sales data, an application can retrieve data about customers matching a selected region, and the returned data set can include the customer information, and, in addition, information about the parts these customers ordered can be automatically retrieved.

As another example, an application can retrieve data about customers that recently purchased a selected product. The application also can retrieve the regions the customers live in. As another example, given a selected record about a customer, the system can automatically retrieve data about previous sales activity.

As another example, a query may indicate that sales are down for products where sentiment in documents related to those products is low. The data set of the documents that have the negative sentiment can be automatically joined to the data sets on which this exploratory query is being performed.

In these examples, when a user performs a query on a database, additional data from other data sets is automatically joined and included in the results, and/or in the data set being searched. Such automatic joining is particularly useful where there are multiple distinct databases with similar information but which are not integrated. For example, in a first database, if there is a customer table and a product table that are explicitly related through a foreign key, such a join is readily made. However, if one database has a customer table, and a separate, distinct database has a product table, and the two tables are not related by using a foreign key, then the possibility for an automatic join can be detected using these techniques.

In one particular application, the data sets to be processed are the results of a query that has been applied to a plurality of data sets. The plurality of data sets can be analyzed for potential join fields. For each data set in the results, a join operation can be performed using the selected identified fields in the ranked list that results from the statistical analysis. These joined results can be presented on a display.

Figure 2:
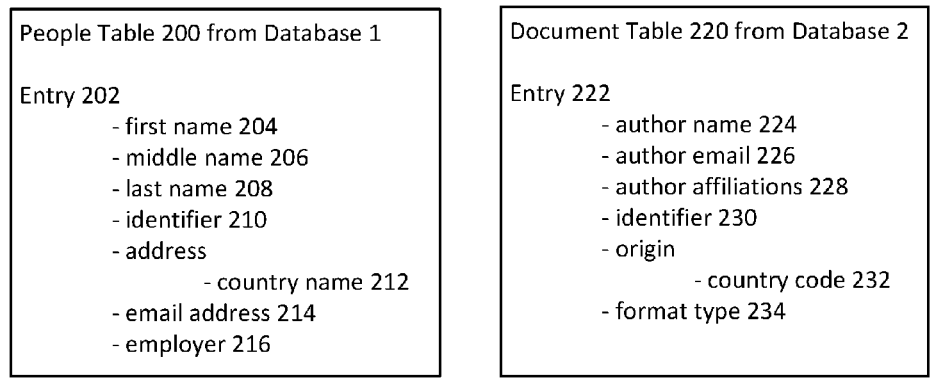
FIG. 2 is a diagram of an illustrative example of data sets to be analyzed for recommending join operations.

Referring now to FIG. 2, this figure provides an illustrative example of multiple data sets to be analyzed from different databases. Such data sets generally are stored in persistent storage, such as in one or more data files or databases.

For example, a first table 200 from a first database includes data about people. Such a table may include an entry (or row) 202 for each person (such as each customer of a company). Each entry includes data in fields (or columns), where that data represents the person. For example, the table 200 can have a first name field 204, a middle name field 206, a last name field 208, an identifier field 210 for each entry. Consider also one or more address fields, of which one field 212 may be a state or country. An email address 214 for the customer may be stored, as well as an employer name 216.

Similarly, a second table 220 from a second database different from the first database includes data about documents may include an entry (or row) 222 for each document. Each entry includes data in fields (or columns), where that data represents the document. For example table 220 can have an author name field 224, which contains the author's first, middle and last names. An author email address 226 and affiliations 228 (such as corporate or academic affiliations) also can be stored. The table also can have an identifier field (or column) 230 for each entry which stores a value which should be unique for each document. This table also may include various other fields, some of which may be useful for joining tables. Such additional fields can include, for example, one or more origin fields, which may include country code 232 for a country of publication. Another field can indicate a format type 234 of the document, a date of indexing, and so on.

Some fields are not likely good candidates to be selected for joins and can be removed from the analysis data. For example, a field that stores only yes/no values, other binary values, Boolean values, a small set of values, auto-increment values (such as serial numbers), countries, states or other information which are not likely to enable a realistic join operation can be excluded. The exclusion of such fields can be implemented in a number of ways, such as by marking the field as excluded in the data set itself, by analysis of the data set, or through user input indicating exclusion of the field. In the foregoing examples, the country name and country code fields, the identifier fields, and the format type fields can be excluded. Fields that tend to be good fields are those storing postal codes or zip codes, geographical region information, product "stock keeping units" (SKU's), and email addresses.

Figure 3:
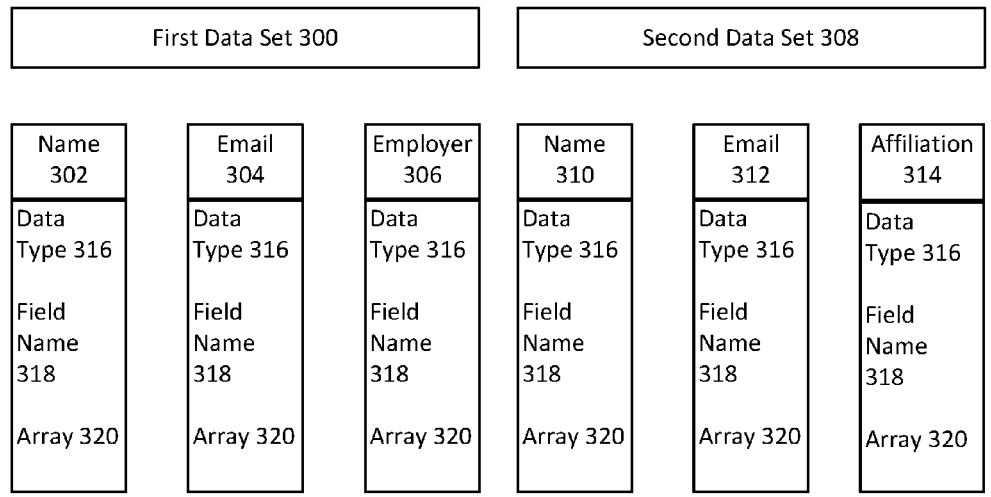
FIG. 3 is a diagram of an illustrative example of analysis data sets extracted from the plurality of data sets for performing statistical analyses.

Referring now to FIG. 3, this figure provides an illustrative example of analysis data extracted from the data sets shown in FIG. 2. A data accessor (e.g., in FIG. 1) generally extracts such analysis data from persistent storage and stores the extracted data in memory for ready access by one or more processing units for performing analysis operations. For example, name data can be extracted into a single string, or into a structured array of first name and last name, and optionally additional name fields (e.g., title, middle name, etc.).

In this example, the name, email address and employer fields are extracted from the people table 200 in FIG. 2, and the name, email and author affiliation fields are extracted from the document table 220 in FIG. 2. The other fields shown in FIG. 2 but not shown in FIG. 3 are examples of fields that can be excluded from the analysis. Thus the analysis data includes, in a first data set 300, a name field 302, an email field 304 and an employer field 306. In a second data set 308, there is a name field 310, email field 312 and an affiliation field 314. The data type and field name for the extracted fields can be stored as indicated at 316 and 318 respectively, followed by an array 320 of values extracted from those fields.

Figure 4:
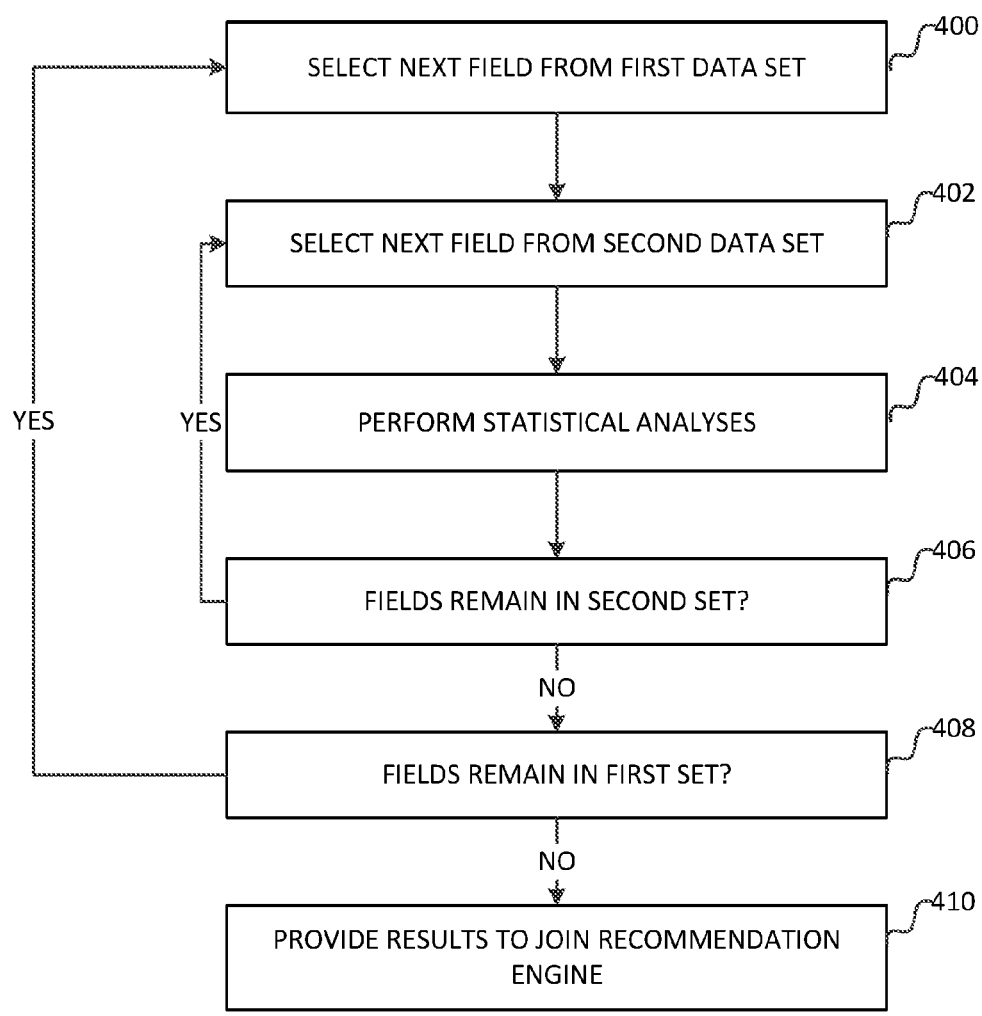
FIG. 4 is a flowchart describing an example operation of processing the analysis data from multiple data sets to suggest fields for joins.

Referring now to FIG. 4, a flow chart describing an implementation of the statistical processing engine will now be described.

The statistical processing engine selects each possible pair of fields from each data set, excluding the data sets that are not likely to enable a realistic join operation, and performs an analysis using data from the selected pair, and repeats this process for each possible pair. Accordingly, a field from the first data set is selected at 400 and a field from the second data set is selected at 402. The statistical processing engine obtains results for statistical analyses, as indicated at 404 and described in more detail in connection with FIG. 5. The next field in the second data set is selected at 402 if more fields remain, as determined at 406. If no fields remain in the second data set, then the process is repeated with the next field in the first data set, which is selected at 400 if more fields remain in the first data set, as determined at 408. If no fields remain in the first data set, then the statistical analyses of the pairs of data sets is complete. The statistical processing engine can provide the results to a join recommendation engine as indicated at 410. In one implementation, the results for each pair of fields can be provided to the join recommendation engine as the results are produced.

Figure 5:
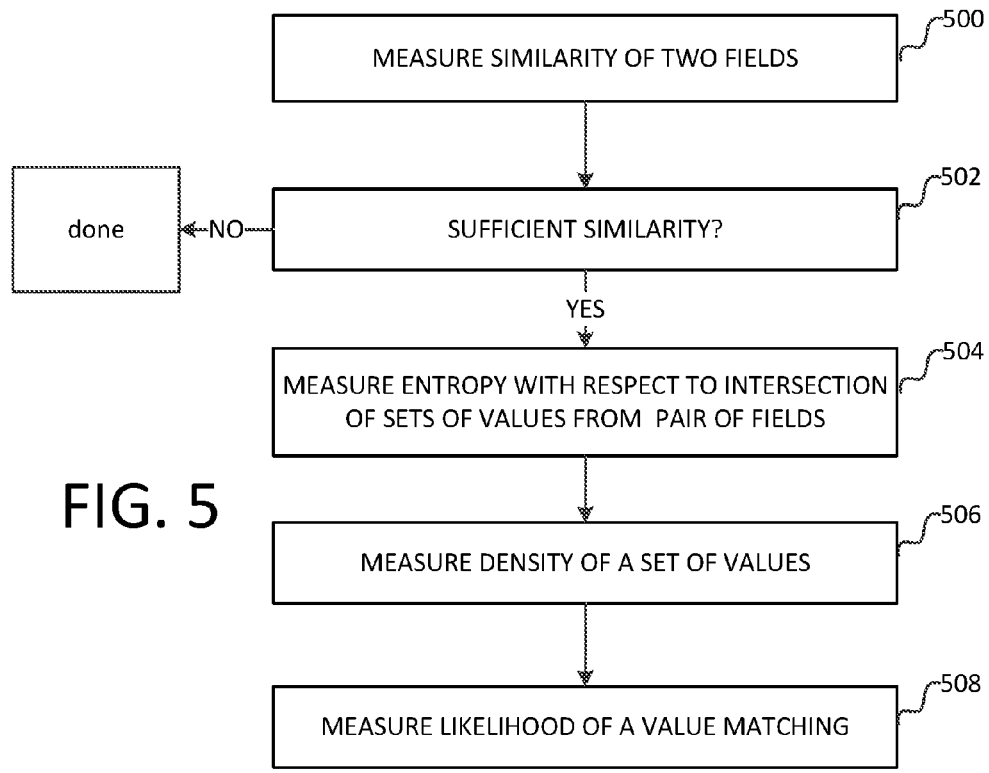
FIG. 5 is a flowchart describing an example operation of the statistical analysis performed on a pair of fields from different data sets.

Referring now to FIG. 5, an example implementation of the statistical analyses performed on a pair of fields from two data sets will now be described.

As indicated at 500, similarity of the data in the two fields is measured. In particular, the values of the selected field from the first data set are compared to the values of the selected field from the second data set.

For example, an appropriate similarity (or difference) metric, given the type of the data in the fields, can be used to compare each pair of values. For example, a Euclidean, squared Euclidean or other distance metric can be used for multidimensional numerical values; a Hamming distance or other string matching metric can be used to compare strings; a binary metric can provide a simple equality metric, and so on. The individual comparison results for each value pair can be aggregated to provide a similarity measure between the two data sets.

The similarity measure for the pair of fields is compared to a threshold to determine if there is sufficient similarity in the values of the data fields to make further analysis worthwhile. This threshold can be a user-defined setting, for example. If the comparison indicates that there is insufficient similarity, as illustrated at 502, processing ends, as illustrated at 504. Otherwise, this pair of fields is identified as a potential candidate and further analysis is performed.

In the further analysis, a variety of computations can be performed. In one implementation, the statistical processing engine then measures entropy with respect to an intersection of the sets of values of a pair of fields identified as potential candidates.

In an example implementation, the entropy with respect to the intersection of the sets of values v and w of the identified fields F and G from the pair of data sets A and B can be calculated by computing the entropy of the multiset containing all values in a field F (with repetitions), but after removing (or projecting out) the values which do not occur in G.

A multiset is $(S, \mu)$ where S is the (ordinary) set of values and $\mu$ is a function from S to N (the non-negative integers). $\mu(v)$ is the multiplicity of v. The multiset of values is computed for each field F: $(V_F, \mu_F)$. The entropy $H_{FG}$ of field F with respect to the intersection of (the values in) field F with field G is computed using the following formula:

$$H_{FG} = H((V_F \cap V_G, \mu_F))$$

where H is the entropy function:

$$H((V,\mu)) = -\Sigma_{v\ in\ V} (P(v) \log_2(P(v)))$$

where $P(v)$ is $\mu(v)/(\Sigma_{w\ in\ V} \mu(w))$. To compute this formula, the computer system computes $\mu(v)$, the number of times the element v occurs in field F of table A. Then, the computer system computes $-\Sigma_{v\ in\ V} (P(v) \log_2(P(v)))$ wherein the probability $P(v)$ is computed by dividing the number of times v occurs by the total number of elements in the multiset:

$$P(v) = \mu(v)/(\Sigma_{w\ in\ V} \mu(w)).$$

This calculation can be normalized by two additional steps. Normalization is performed to enable comparisons between different intersections with different cardinalities, which comparisons allow the intersections with more entropy to be identified. To normalize, a maximum possible entropy $H_{max} = \log_2(\Sigma_w \mu(w))$ for any multiset containing the same number of elements is computed. The normalized entropy with respect to the intersection of fields F and G is then $H'_{FG} = (1 + H_{FG})/(1 + H_{max})$, where 1 is added to avoid division by zero.

In order to make the entropy calculation above more efficient, a random sample of the first data set is computed. A Bloom filter is then applied to the entire second data set.

In addition to entropy with respect to the intersection of the sets of values, density of one or both of the identified fields in the pair of data sets can be measured, as indicated at 508. Density of a field F of a table A is the number of rows of table A which contain any value at all for the field F, i.e., the number of times the field is not null, divided by the total number of rows in table A.

In addition to entropy with respect to the intersection of the sets of values, a likelihood that a value in the identified fields in the first data set matches a value in the identified fields in the second data set can be measured, as indicated at 510. The likelihood of finding a value v from field F of table A in field G of table B is the cardinality of the multiset intersection of F and G divided by the cardinality of the multiset F, or |F intersect G|/|F|. Other set similarity metrics can be used. In order to make this likelihood calculation more efficient, a random sample of the first data set is computed. A Bloom filter is then applied to the entire second data set.

Figure 6:
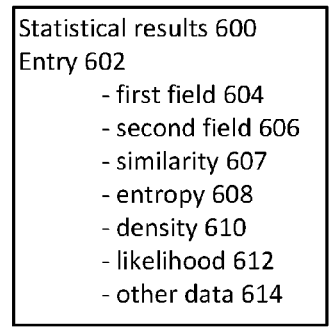
FIG. 6 is a diagram of an illustrative example of a data structure for maintaining statistical analysis results performed on two data sets.

As shown in FIG. 6, the statistical processing engine can store its results in a data structure, generally of the form of a list 600. Such a list can includes an entry 602, for each pair of fields, and indicates the field 604 from the first data set, the field 606 from the second data set, a measure 607 of the similarity, if computed, a measure 608 of the entropy with respect to the intersection of the sets of values of this pair of fields, a measure 610 of density of one or both of the identified fields and a measure 612 of likelihood that a value in the identified field in the first data set matches a value in the identified field in the second data set. One or more additional values 614 also can be stored in the data structure, which can be additional statistical measures, for example. Given such a data structure, the statistical processing engine can populate the entries in the data structure while computing the statistical analyses, such as described in FIGS. 4 and 5. After (or during) statistical processing is completed, the entries can be sorted based on any of the various measures stored in the data structure, which in turn allows a ranked list of pairs of potential joins, if any, to be obtained for a pair of data sets.

Figure 7:
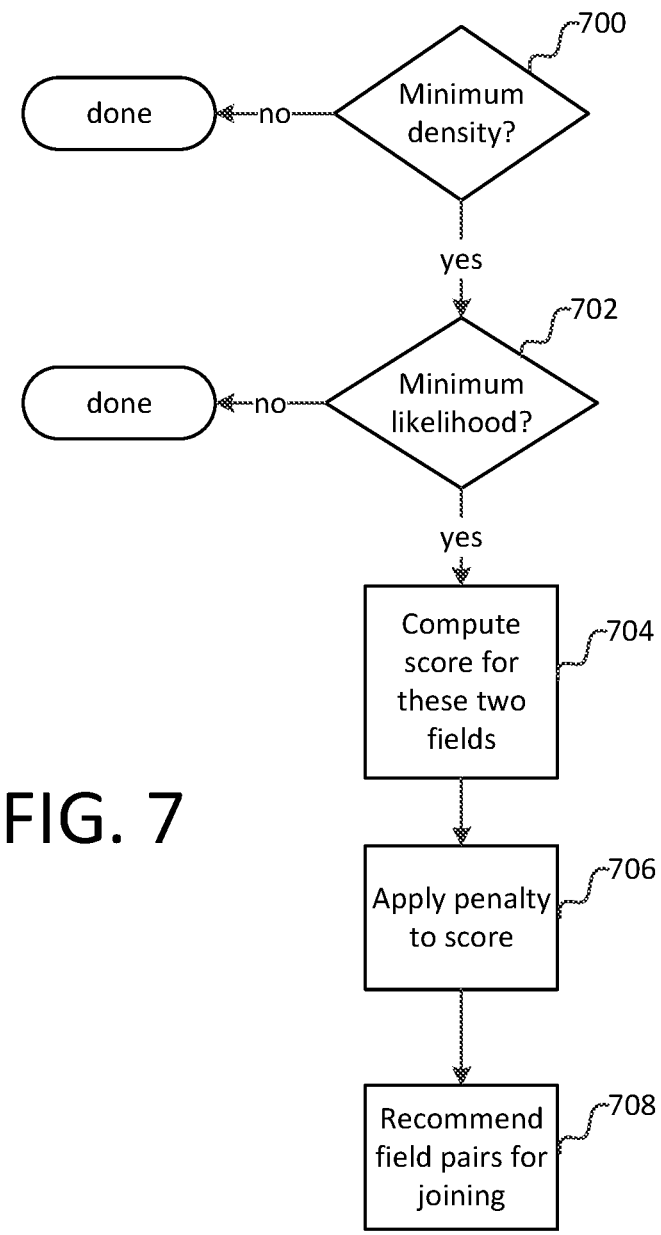
FIG. 7 is a flow chart describing an example implementation of applying statistical analyses to a pair of fields from two data sets.

FIG. 7 describes an example implementation.

For a given pair of data sets of values v and values w, respectively from field F of table A and field G of table B, the density of one of the sets (e.g., field F) is computed and compared to a threshold, as indicated at 700. If the density of one of the fields does not exceed a minimum, e.g., 10%, then this field pair combination (e.g., field F and field G) is discarded as a possible recommendation for joining.

Otherwise, processing continues and the likelihood of finding a value from a field F in table A in a field G in table B is then computed and compared to a threshold, as indicated at 702. This likelihood is the size of the multiset intersection of fields F and G divided by the size of the set of values v in field F. If this likelihood does not exceed a minimum, e.g., 50%, then this field pair combination is discarded as a possible recommendation for joining.

Next, a raw score for this pair of fields F and G is then computed 704. This raw score can be, for example, the normalized intersection entropy given the sets of values v and values w, respectively from field F of table A and field G of table B. This raw score can be further scaled by one or both of the density or likelihood values used in steps 700 and 702. A penalty can be applied 706 to this raw score, for example, if the data type or field names of the fields F and G do not match. Note that in the foregoing explanation, the various set operations are multiset operations.

For example, the penalty can be a scaling factor. Such a scaling factor can be selected so as to penalize fields that do not match, but would permit non-matching fields to be used in the event that no matches are found. As an example, if the data types are unjoinable (e.g., money, floats, doubles, date data types), the penalty can be a scaling factor of 0.2. If the data types do not match, then the penalty can be a scaling factor of 0.5. If the names of the fields do not match, then the penalty can be a scaling factor of between 0.5 to 1.0. For example, if one of the field names is a prefix of the other (e.g., "comp" is a prefix of "company"), then the scaling factor can be higher (e.g., 0.95). A distance metric applied to the field names also can be used as part of a function to compute a scaling factor. For example, the Levenshtein edit distance between two names divided by the minimum lengths of the two names, subtracted from one but limited to a minimum value such as 0.5, can be used to compute a scaling factor.

Given a score for a pair of fields F and G after step 706, a recommendation can be made 708 regarding that pair of fields. A minimum score optionally can be enforced by applying a threshold, such as 0.5, to the score for the pair of fields. Different pairs of fields can be ranked by their score as part of the recommendation. The computer system can present a user interface to a user that allows the user to select a pair of fields based on these scores. The user interface can include information about the different fields (e.g., field names, types and tables in which they reside) and optionally the score for each pair of fields.

The recommendation generally will take one of four forms. For example, given a table A, this analysis could be performed by analyzing multiple other tables, of which one is table B. In such a case, suitable fields in table A are compared to suitable fields in other tables to identify good fields to support a join operation. The analysis identifies a field F in table A to be joined with a field G in a table B.

As another example, given a table A and a field F, this analysis could be performed by analyzing multiple other tables, of which one is table B. In such a case, field F in table A is compared to suitable fields in other tables to identify good fields to support a join operation. The analysis identifies a field G in table B to be joined with the specified field F in table A.

As another example, given a table A and a table B, this analysis could be performed by analyzing the fields of both tables A and B. In such a case, suitable fields in table A are compared to suitable fields in table B to identify good fields to support a join operation between the two tables A and B. The analysis identifies a field G in table B to be joined with a field F in table A.

As another example, given a field F in a table A and a table B, this analysis could be performed by analyzing the fields of table B with respect to field F of table A. In such a case, suitable fields in table B are compared to field F in table A to identify good fields to support a join operation using field F in table A and a field in table B. The analysis identifies a field G in table B to be joined with the specified field F in table A.

The following section describes an example operating environment of a computer that processes data sets to identify or recommend fields in those data sets that can be the basis for a join operation in accordance with a second embodiment. Aspects of the first and second embodiments can be combined in still further embodiments and this disclosure contemplates such combinations.

Figure 8:
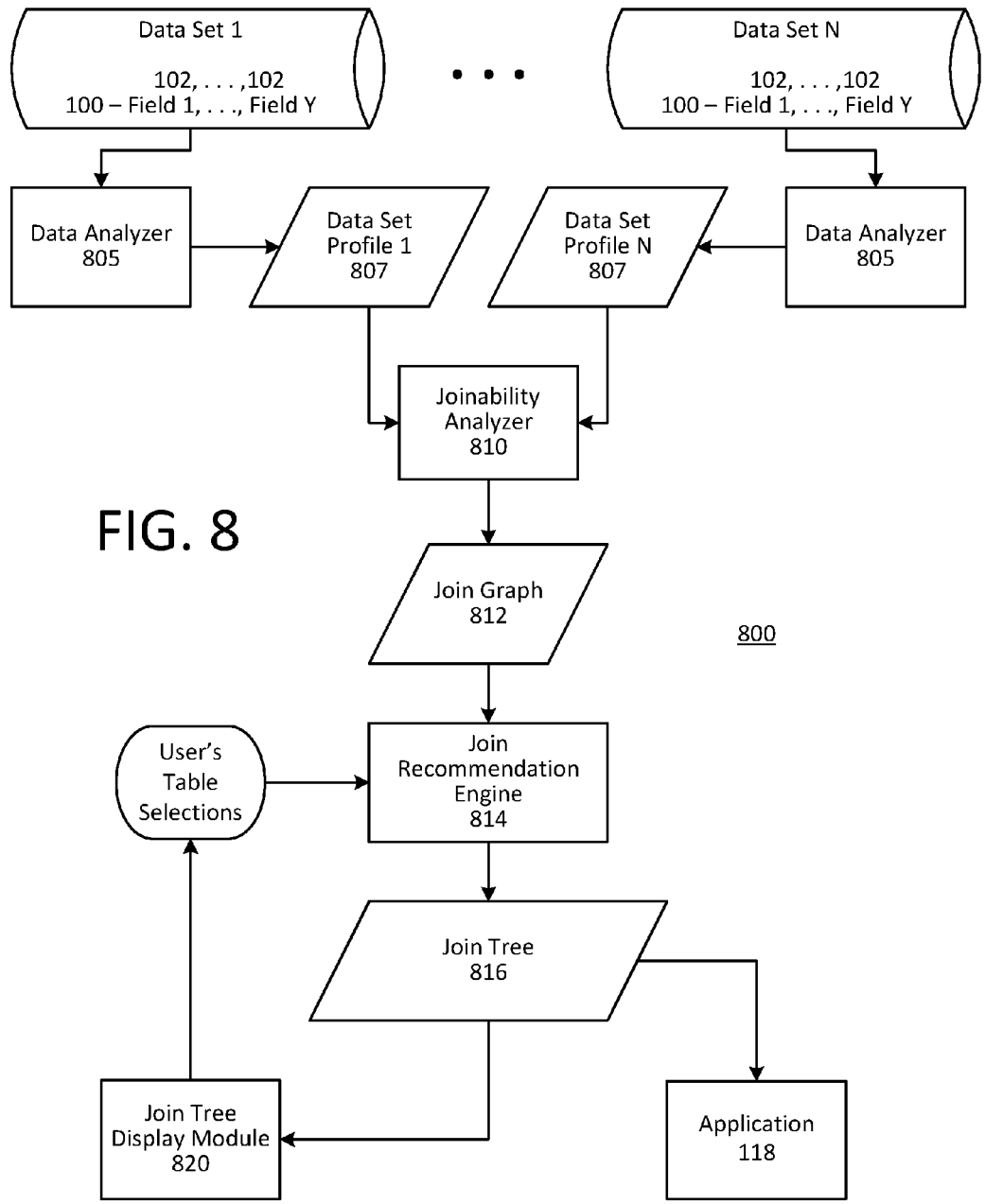
FIG. 8 is a diagram of a system configured for processing large corpora of structured tabular data files to identify or recommend columns or fields in those data files that can be the basis for a table join operation.

FIG. 8 illustrates a diagram of a system 800 configured for processing large corpora of structured tabular data files to identify or recommend columns or fields in those data files that can be the basis for a table join operation. The system 800 is configured to identify such columns where relationships between tables or columns may not be defined or may not exist in any database schema. The system 800 is configured to be capable of processing large numbers of tables, with large numbers of rows, typically referred to as "big data." The number of tables processed in typical implementations can exceed, for example, 100,000, and the number of rows per table can exceed, for example, 1 billion. The recommended joins may not be complete or perfect joins, but nevertheless, the recommended joins may produce useable results for a substantial portion of the records or rows of interest.

As shown in FIG. 8, a data analyzer module 805, which can be embodied as one or more computer programs, applications or hardware modules operating on one or more computers, accesses and analyzes data sets 1 through N to create data set profiles 807, 1 through N. The data set profiles 807 created by the data analyzer module 805 include profile data that are used by a joinability analyzer module 810 to determine the joinability of columns from different data sets.

The profile data for a data set can include data related to the data set as well as to each of one or more of the columns within the data set. The profile data related to the data set can include, for example, the name of the data set or table and the number of rows in the data set (and in each column of the data set). The profile data for a column can include, for example, the column's field name, the type of data stored in the column (referred to below as columnType), the cardinality of the column (number of distinct elements excluding duplicates), the uniqueness of a column's values (cardinality/# of elements—which is indicative of whether the column contains a primary key), and a score or indication of whether the column is a potential candidate for a join operation.

In one embodiment, column-specific data set profiles 807 can be created for each column within any single data set. In such cases the column-specific data set profiles can be configured to include or make reference to the more general table-specific profile data such as the name of the data set or the number of rows in the data set. Alternatively, any table-specific profile data can be replicated in each column-specific profile for all associated columns.

To account for large data sets, approximation or estimation techniques can be used to determine, for example, the cardinality of a column, since an approximate value may be sufficient for the purpose of determining joinability, as will be discussed in greater detail below. In addition, a subset of all the data in a column or data set can be analyzed in order to generate some or all of the profile data, such as when a high level of confidence is gained based on consistency of data so far analyzed (e.g. all of the elements analyzed so far are determined to be social security numbers).

The data analyzer 805 can apply different methods or techniques to identify the type of data stored in a column, such as, for example, Boolean, integer, non-negative integer, floating point number, first name, social security number, street address, part number, credit card number, or globally unique identifier. Regular expressions can be used to match on and identify rule-based data types, such as, for example, social security numbers, credit card numbers, globally unique identifiers, integers, non-negative integers, floating point numbers. Dictionaries can be used to identify data types where most of the observed occurrences are due to a relatively small number of items, such as, for example, given and family names, city names, and country names. Generative rules or other customized rules can be used to identify values that are noisy or difficult to characterize, but where it's not possible to list them, such as, for example, street addresses. A column's field name can also be used as an indication of the type of data, such as for Boolean data. The data analyzer 805 can apply the different methods in parallel or simultaneously to determine how many hits a column produces for each possible type. At a certain point, usually long before all the column values have been processed, the data analyzer can reach a threshold confidence that it has identified the most accurate column type from among the possible column types, or that there is no appropriate column type at all.

The data analyzer 805 can also determine a score for inclusion in the data set profile 807 to indicate whether the column is a potential candidate for a join operation. In determining the score, the data analyzer can take into account, for example, uniqueness, the data type of a column and the column's field name. For example, Booleans are not good join candidates because of the small number of distinct values and Boolean columns will have a very low uniqueness. Floating point numbers are also generally impractical for use in joins. Certain field names, such as names that include the substring "index" may provide a strong indication that a field is a good candidate for a join. Different factors can be measured, possibly using rules, weighted, and combined, such as in a weighted sum, to create a joinability score. The score itself can be included in the data set profile 807, or optionally the score can be compared to a threshold and if it exceeds the threshold, then a Boolean indication that the column is a potential candidate for a join can be set in the data set profile 807.

The profile data for a column can also include data descriptive of the column's values. This descriptive data can be referred to as set sketch data or, as referred to below, setSketch. Although the cardinality of a column can be maintained as part of the profile data, the cardinalities of two columns are not sufficient to determine the cardinality of an intersection between the two columns. The set sketch data, however, as will be described below, can be used to perform an analysis, using a constant number of calculations, in constant time, of the estimated cardinality of the intersection between two columns, which in turn can be used as a factor in determining joinability. The creation and use of the descriptive data or a setSketch is not required for the overall process to function, but use of the setSketch can increase performance of the system 800 significantly for large data sets. Accordingly, references to setSketch or sketch data in the pseudocode and descriptions that follow should be considered optional.

In one embodiment, the data analyzer 805 executes a process, to generate the data set profiles, that can be represented in pseudocode as follows:

```
{
    for each table T:
        for each column C in T:
        {
            create a setSketch[T][C]
            define a columnType[T][C]
        }
}.
```

In one embodiment, a data accessor 104 (FIG. 1) can be used to access the data sets from persistent storage and to process the data sets as discussed above prior to analysis by the data analyzer 805. The data accessor 104 can be integrated into the data analyzer 805.

A joinability analyzer module 810, which can be embodied as one or more computer programs, applications or hardware modules operating one or more computers, processes and/or analyzes the data set profiles 807 for each pair of tables to create a join graph 812. The join graph 812 is a directed graph where each table is represented by a node and the nodes are connected by directed edges that identify columns in the nodes for a recommended join. Each edge is assigned a weight based on a joinability score that is representative of the predicted level of success in performing a join from a first column to a second column based on the analysis of the data set profiles for the columns. The direction of an edge in the join graph 812 represents the direction of the recommended join represented by the edge. Example implementations of a joinability analyzer 810 will be provided in more detail below.

In one embodiment, the joinability analyzer 810 executes a process, to generate the join graph 812, that can be represented in pseudocode as follows:

```
{
for each table T1 and T2, where T1 != T2:
    for each column C1 in T1 and C2 in T2:
    {
        use setSketch[T1][C1], setSketch[T2][C2], columnType[T1][C1], columnType[T2][C2] to calculate the joinability score of C1 to C2
            if the joinability score from C1 to C2 is above a threshold
            and if the joinability score from C1 to C2 exceeds the
joinability score of any existing edge from T1 to T2, then
                add a directed, joinability-weighted edge to the
join graph from node T1 to node T2, identifying C1 and C2, replacing
any existing edge from T1 to T2
    }
}.
```

Figure 9A:
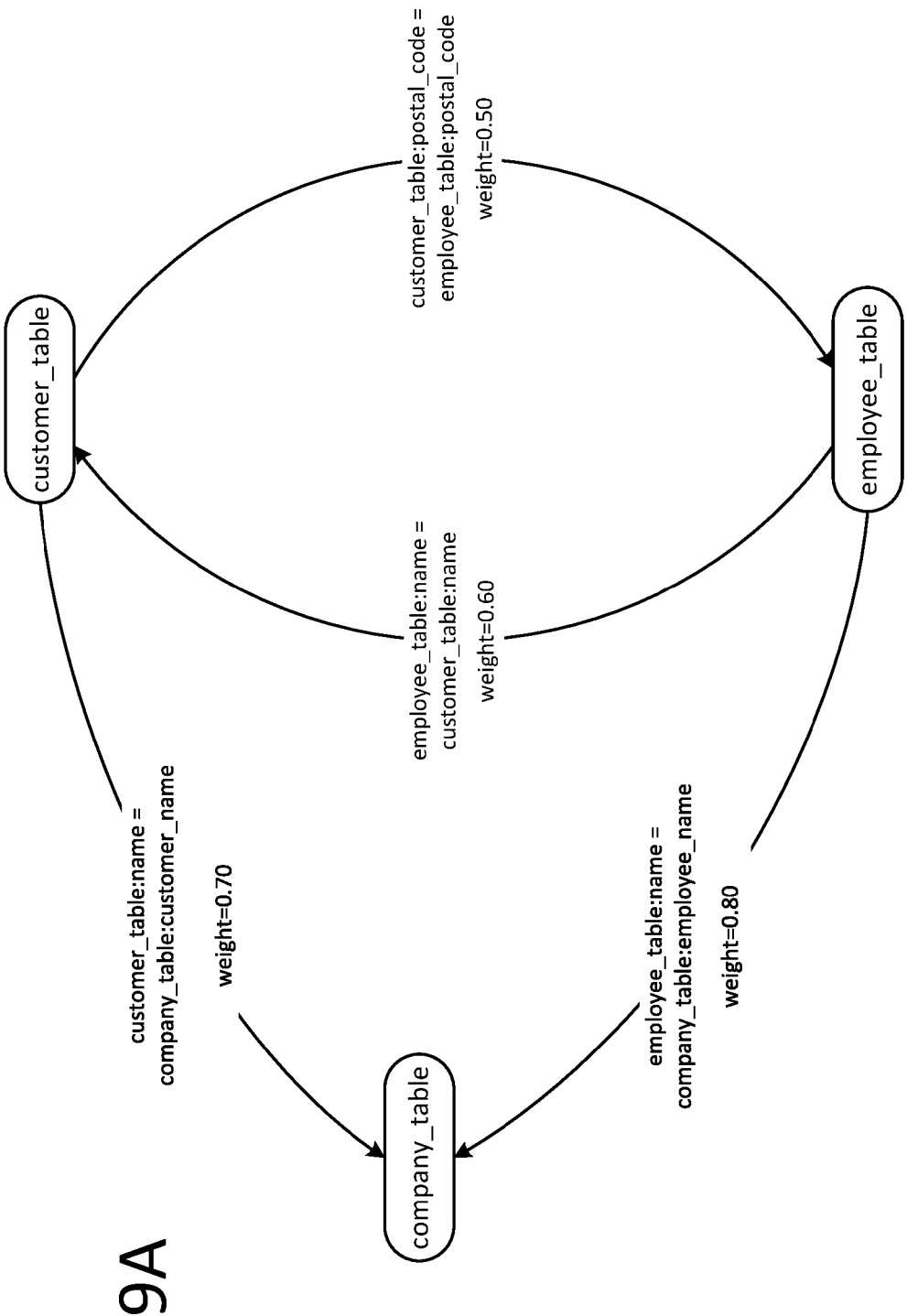
FIG. 9A is a highly simplified example join graph for three tables.

FIG. 9A illustrates a highly simplified example join graph for three tables: a company_table, a customer_table, and an employee_table. An actual implementation of a join graph, however, might contain 100,000 or more nodes. Once the joinability analyzer module 810 completes its processing of the tables and their columns, in the illustrated example, it produces a graph with four directed edges representing pairs of joinable columns between the three tables. A first directed edge goes from the employee_table to the company_table, indicating that the employee_table:name field can be joined with the company_table:employee_name field, where the weight of 0.80 is the joinability score. A second directed edge goes from the customer_table to the company table, indicating that the customer_table:name field can be joined with the company_table:customer_name field, where the weight of 0.70 is the joinability score. A third directed edge goes from the employee_table to the customer table, indicating that the employee_table:name field can be joined with the customer_table:name field, where the weight of 0.60 is the joinability score. A fourth directed edge goes from the customer_table to the employee table, indicating that the customer_table:postal_code field can be joined with the employee_table: postal_code field, where the weight of 0.50 is the joinability score.

Referring again to FIG. 8, a join recommendation engine 814 receives from a user a selection of tables from the available tables processed by the data analyzer 805. The user can optionally also select required joins or edges to be included in the results. In certain embodiments, the selection of tables, required joins and edges can be received from an automated system or another application instead of or in conjunction with input from a user. The join recommendation engine 814 creates a join tree 816 that includes nodes and edges of the join graph 812 that connect all the selected tables using recommended joins. A join tree display module 820 then displays the recommended joins to the user. If the user is unsatisfied with the recommended joins, the user can adjust the selection of tables, exclude recommended joins (edges) from consideration, and/or select required joins (edges) and the join recommendation engine 814 can create a new join tree 816 based on the user's adjustments. Once the user is satisfied with the recommended joins, the joined data can be passed on to an application 118 for further processing, output, or display. The application 118, for example, can create a Structured Query Language (SQL) query to be executed on the user's table selections based on the join tree 816. The results of the SQL query, in turn, can then be provided to the user.

In one embodiment, the join recommendation engine 814 executes a process, to generate the join tree 816 and an SQL query, that can be represented in pseudocode as follows:

```
{
    receive a selection of tables from the user
    obtain a subset of nodes from the join graph including all nodes
corresponding to the selected tables
    create a join tree by selecting a subset of edges from the join
graph that create a spanning tree across the subset of nodes
    present the join tree to the user
    create SQL query from the join tree
}.
```

In one embodiment, the spanning tree that is created is a maximum spanning tree. To create the maximum spanning tree, Kruskal's algorithm for determining a minimum spanning tree, which is well-known in the art, can be applied by negating the weights of the edges of the join graph and ignoring the directionality of the edges. The resulting join tree spans all the tables (nodes) selected by the user, without any circuits. For any N tables (nodes) selected, the join tree will necessarily include exactly N−1 edges and the included edges will have a maximum aggregate weight or joinability score of the available edges from the join graph.

In order to facilitate the selection by the user of required or excluded joins, the display module 820 can be configured to display to the user a list of available joins (edges) between tables selected by the user. The display module can further be configured to support searching or filtering of the list by the user. In the case that the list of available joins is presented with a suggested join tree, the list can be configured to include those edges that are not already included in the join tree. The user can be given the opportunity to add a required edge from the available edges and a new join tree can be determined and then again displayed to the user. In the case that a user selects required edges, Kruskal's algorithm can be modified by seeding the tree to be created with the required edges. In the case that the user excludes edges, those edges can be eliminated from consideration.

As will be appreciated by one skilled in the art, alternative methods or algorithms for creating a maximum spanning tree could be used to create the join tree 816. In additional embodiments, the join tree 816 need not necessarily be a maximum spanning tree. For example, as an alternative, the maximum distance between nodes in the resulting tree can be taken into account, where increased distances between nodes are penalized or where the resulting tree is limited to having a maximum distance between nodes.

Figure 9B:
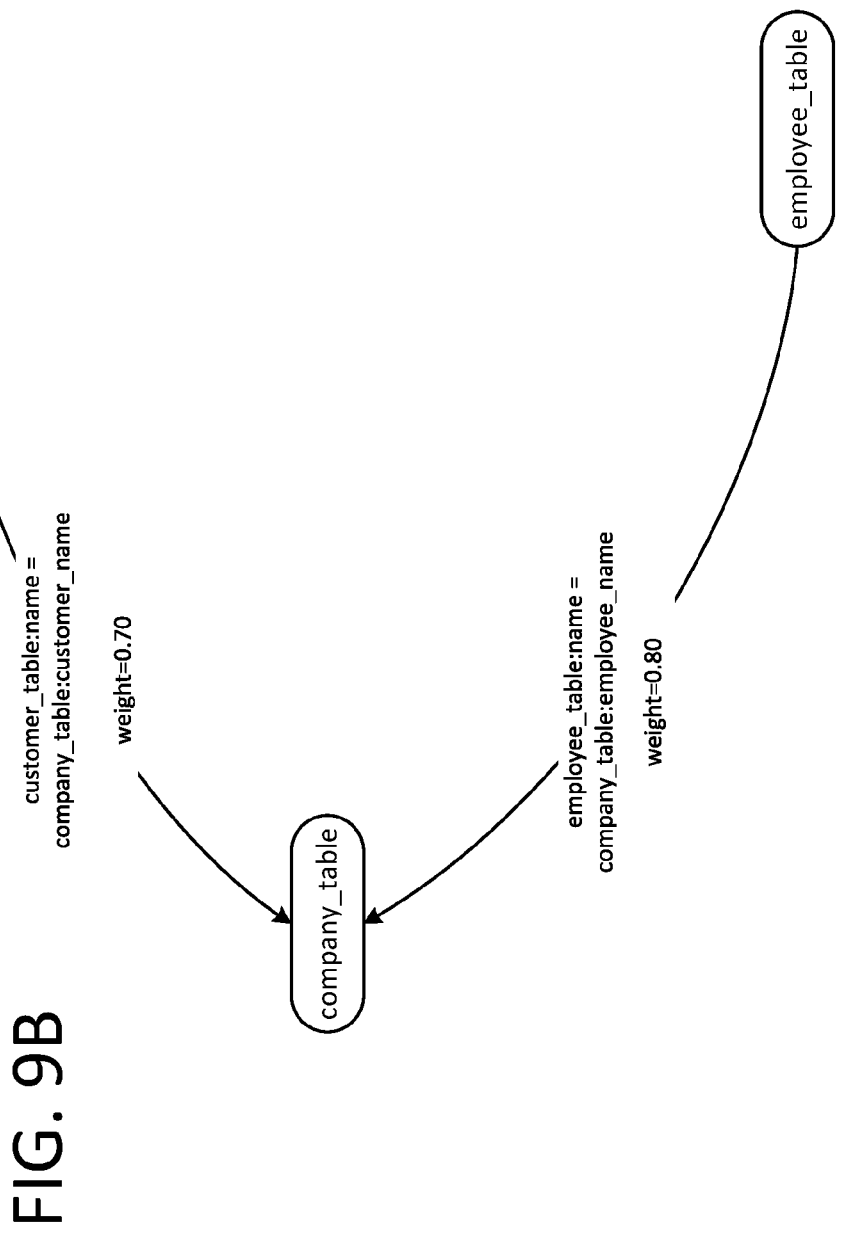
FIG. 9B is join tree that would be produced if a user were to select all three tables from the join graph of FIG. 9A.

FIG. 9B illustrates a join tree that would be produced by the join recommendation engine 814 if a user were to select all three tables from the join graph of FIG. 9A. As shown, the join recommendation selects the two highest weighted edges, totaling 0.80+0.70=1.50 in order to connect the three tables. Note that the two joins (edges) that directly connected customer_table and the employee_table were not included due to their lower joinability scores and since they were not necessary to connect all three nodes in a tree. Note that the join tree can be easily translated into an SQL statement by creating a join based on the identified tables, columns and directions for each edge. The join tree produced by the join recommendation engine 814 will not contain any circuits or loops and so, like any valid SQL statement, the resulting SQL statement also will not contain any circuits or loops.

The joinability analyzer 810 determines, for a column C1 in table T1 and a column C2 in table T2, a joinability score that represents a predicted level of success or a usefulness of an outcome in performing a join from C1 to C2. In on embodiment, when the determined joinability score for C1 to C2 exceeds (or meets) a pre-determined threshold, it is used as a weight for a directed edge added to the join graph 812. In different embodiments, the joinability score can be determined based on one or more factors or metrics, which can be combined and weighted in a process or formula. The combination between the factors or metrics can be, for example, a weighted sum of the different factors, a product of the factors or a combination between weighted sums and products. Other combinations are possible as well. The score calculation can be configured, or scores can be normalized, such that all scores fall within the range of 0.0 to 1.0 or any other desired range. The joinability score can take into account one or more factors such as, for example, similarity between field names of the columns, the likelihood of finding a value from the first column in the second column, the similarity between the values contained in the columns, the data type of each column, the cardinality of one or both columns, and a measure of entropy with respect to an intersection of the sets of values of the columns.

In one embodiment, the likelihood of finding a value v from column C1 in column C2 is used as the similarity or as a factor in the joinability score for an edge representing the join from C1 to C2. The similarity between the field names of C1 and C2 can also be determined (e.g. by Euclidian distance or Hamming distance) and included in the joinability score as an additional factor. The similarity between field names can be particularly useful when the columns are integer types.

As one example of a determination of a joinability score, the data types of columns C1 and C2 are compared. If the data types do not match, then the joinability score is deemed to be zero and no edge is added to the join graph. Next, if the data types do match, then a likelihood of finding a value v from column C1 in the column C2 is determined with the resulting likelihood being used as the joinability score. This likelihood can be computed by dividing the cardinality of the intersection of C1 and C2 by the cardinality of C1 as follows:

likelihood v from C1 is in C2=|intersection(C1,C2)|/|C1|.

The intersection of C1 and C2, as well as the cardinalities can be determined using well-known techniques. When C1 and/or C2 involve exceptionally large sets of data, however, such as on the order of 1 billion rows, exact calculations of cardinality can become compute intensive, and estimations or approximations of cardinality may work equivalently well. In certain embodiments, therefore, estimations of column cardinality are determined, stored in the data set profile 807 and used by the joinability analyzer 810 to determine likelihood.

In one embodiment, an estimation of the cardinality of a column and the creation of the setSketch are performed using the HyperLogLog algorithm, as described in Flajolet, Philippe, et al., "HyperLogLog: the analysis of a near-optimal cardinality estimation algorithm," DMTCS Proceedings 1 (2008), and as further described in Heule, Stefan, et al., "HyperLogLog in practice: Algorithmic engineering of a state of the art cardinality estimation algorithm," Proceedings of the 16th International Conference on Extending Database Technology, ACM (2013). The data analyzer 805 can use the HyperLogLog algorithm, as it is described in the foregoing references, to determine a near-optimal estimate of the cardinality for each analyzed column, which can be stored in the data set profile 807. In additional embodiments, other algorithms for estimating cardinality, such as, for example, LogLog or HyperLogLog++, can be used.

In implementing the HyperLogLog algorithm (or in certain other cardinality estimation algorithms), the data analyzer creates a set of m observables, as discussed in Flajolet, for a column of data. The m observables are stored in, as, or as part of, the above-referenced set sketch data (m being a positive integer constant greater than one). As noted in Flajolet, each of the m observables is a function of the set of elements underlying the analyzed data, independent of replications. In accordance with the HyperLogLog algorithm, an estimate of the cardinality of a column can be calculated using the m observables in a constant number of operations, in constant time.

The m observables, as implemented by the data analyzer 805 and stored as the set sketch data for each column, have the further property that corresponding observables for two columns can be combined or merged, by taking the maximum of each pair of corresponding observables, to create new set of combined observables that represents the union of the two columns. The new set of combined observables can then be processed using the same calculation, in a constant number of operations, in constant time, to determine an estimate of the cardinality of the union between the two columns. Once the cardinality of the union of the two columns has been calculated, the cardinality of the intersection of the two columns can be calculated by subtracting the cardinality of the union from the sum of the individual cardinalities of the two columns as follows:

|intersection(C1,C2)|=|C1|+|C2|−|union(C1,C2)|.

In this manner, the actual intersection of the two columns need not be created, reducing computational and storage requirements, and the cardinality of the intersection of two columns can be determined in constant time relative to the size of the columns once the set sketch data for each column has been created. When large numbers of columns are being compared, the computational savings can be significant.

The join recommendation engine 814 can also be configured to handle cases where a user selects a set of nodes (tables), but where the join graph does not contain sufficient edges to connect the user's tables. By way of example, assume a global join graph has been created, where the graph nodes represent tables and the weighted, directed graph edges identify table columns with high joinability. This global join graph may have a large number of nodes (e.g. 100,000 or more) and a correspondingly larger number of edges. A user may choose a small subset of the global tables, perhaps using a search of table metadata or table contents, to be added to a mart for a joinability analysis (a "mart" is used herein to refer to a selection of tables). Since the global graph likely does not include an edge from every table to every other table, there is no guarantee that the subset of edges that starts and ends in the selected subset of tables actually connects all the nodes together into a single graph. As a result, the join recommendation engine may produce two or more separate trees or components that cannot be joined together with the available edges from the global join graph. If the join recommendation engine 814 cannot create a spanning tree with the available nodes selected by the user, the engine can add additional tables to the mart such that all tables selected by the user, when supplemented by the additional tables, can be joined in a join tree 816.

In one embodiment, the join recommendation engine 814 executes a process, to identify the additional tables (nodes) to connect two or more separate components and then create a spanning join tree, that can be represented in pseudocode as follows:

```
{
  a current mart yields a plurality of disconnected components
  repeat until all disconnected components are connected:
  {
    select a pair of disconnected components
    find a best path between selected disconnected components
    connect the disconnected components with the best path
    add the intermediate nodes in the best path to the mart
  }
  generate the join tree using the updated mart
}.
```

In selecting a pair of disconnected components, the recommendation engine 814 can select components, for example, randomly, in order of size, or by attempting to connect multiple pairs of components and selecting a best path between the multiple pairs. In finding a best path between selected disconnected components, edge directions can be ignored.

In order to find the best path, the engine can iterate over every possible pair of tables A and B where A in is one component and B is in the other component, finding the optimal path and the associated loss between each pair of tables. Loss for a path can be defined as follows:

Path Loss=$\Sigma_{e\ in\ path}(1.0-w_e)$ for a sequence of edges e in a path, each edge having a weight $w_e$ in the range [0.0, 1.0]. From the resulting paths, the engine can then select the optimal path with the smallest path loss as the best path.

In one embodiment, in order to determine an optimal path between a pair of tables, an A-star algorithm, which is well-known, is applied to the weighted global graph along with an identification of the pair of tables. The A-star algorithm is modified, however, to disregard edge directions in the global graph and to operate on edge loss instead of edge weight, where:

Edge Loss=$1.0-w_e$ assuming each edge has a weight $w_e$ in the range [0.0, 1.0].

In an alternative embodiment, normalized weights in the global join graph can be configured inversely to the foregoing such that weights closer to 0.0, within the range [0.0, 1.0], are considered to represent more highly recommended joins. In this case, as will be understood by one skilled in the art, the edge weights could be used directly by the A-star algorithm without subtracting them from 1, and the edge weights would not have to be negated in the above implementation of Kruskal's algorithm.

In certain embodiments, edge weights in a global join graph 812 can also include user input as a factor. For example, users using or reviewing recommended joins produced by the system 800 can provide up or down votes, or ratings for specific joins that are recommended by the system or included in the join graph 812. Up votes provided by users can act to increase the weight of an edge while down votes can act to decrease the weight of an edge. In the case that large numbers of users are using a global join graph, a factor in the joinability score represented by edges in the join graph can effectively be crowdsourced from user input.

Edges in the global join graph can also be added manually by user input and given an associated weight, such as when a user is aware of a particular or defined relationship between two data sets. In addition, database schemas, which define known relationships between data sources can used to populate edges into the global join graph. For edges included based on manual user input or known database schemas, the weights of the associated edges can be selected to be a maximum value based on the certainty of the known relationship.

Figure 10:
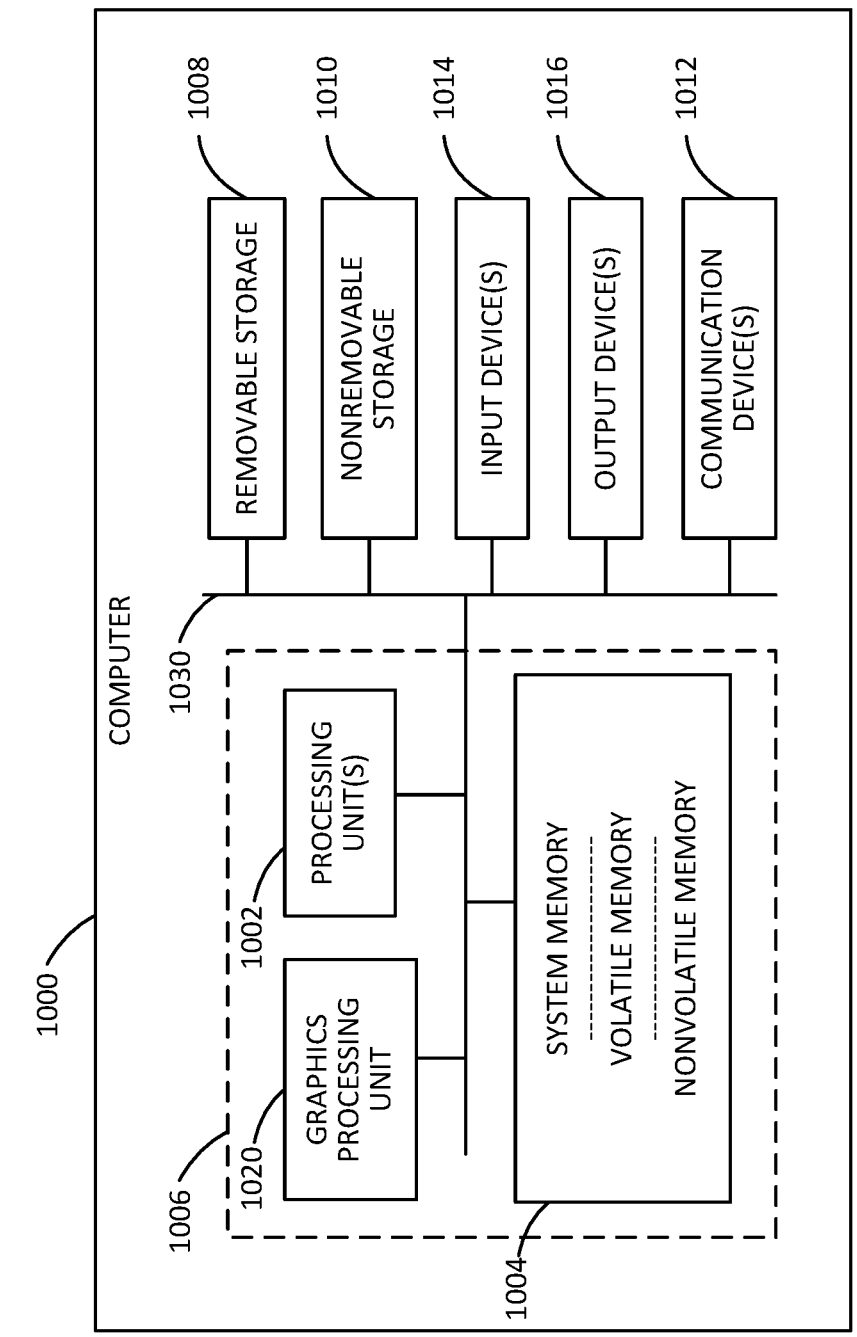
FIG. 10 is a block diagram of an example computer with which components of such a system can be implemented.

FIG. 10 illustrates an example computer 1000. Components of the embodiments disclosed herein, which may be referred to as modules, engines, processes, functions or the like, can be implemented by configuring one or more instances of the example computer using special purpose software or applications, possibly in different configurations and optionally networked, as a computer system. The computer 1000 can be any of a variety of general purpose computers such as, for example, a server, a desktop computer, a laptop computer or a mobile computing device.

On a general purpose computer, a processor typically executes computer programs which include an operating system and applications. The operating system is a computer program running on the computer that manages access to various resources of the computer by the applications and the operating system. The various resources generally include memory, storage, communication interfaces, input devices and output devices.

With reference to FIG. 10, the example computer 1000 includes at least one processing unit 1002 and memory 1004. The computer can have multiple processing units 1002 and multiple devices implementing the memory 1004. A processing unit 1002 can include one or more processors or processing cores (not shown) that operate independently of each other. Additional co-processing units, such as graphics processing unit 1020, also can be present in the computer.

The memory 1004 may include volatile devices (such as dynamic random access memory (DRAM) or other random access memory device), and nonvolatile devices (such as a read-only memory, flash memory, and the like) or some combination of the two. This configuration of memory is illustrated in FIG. 10 by dashed line 1006. The computer 1000 may include additional storage (removable and/or non-removable) including, but not limited to, magnetically-recorded or optically-recorded disks or tape. Such additional storage is illustrated in FIG. 10 by removable storage 1008 and non-removable storage 1010. The various components in FIG. 10 are generally interconnected by an interconnection mechanism, such as one or more buses 1030.

A computer storage medium is any medium in which data can be stored in and retrieved from addressable physical storage locations by the computer. Computer storage media includes volatile and nonvolatile memory devices, and removable and non-removable storage media. Memory 1004 and 1006, removable storage 1008 and non-removable storage 1010 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 1000 may also include communication device(s) 1012 through which the computer communicates with other devices over a communication medium such as a computer network. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals.

Communications device(s) 1012 can include, for example, a network interface or radio transmitter, that interface with the communication media to transmit data over and receive data from signals propagated through communication media. The communication device(s) 1012 can include one or more radio transmitters for telephonic communications over cellular telephone networks, and/or wireless connections to a computer network. For example, a cellular connection, a Wi-Fi connection, a Bluetooth connection, and other connections may be present in the computer. Such connections support communication with other devices, such as to support voice or data communications.

The computer 1000 may have various input device(s) 1014 such as a keyboard, mouse, touchscreen and pen, image input devices, such as still and motion cameras, audio input devices, such as a microphone, and various sensors, such as accelerometers, thermometers and magnetometers. Output device(s) 1016 such as a display, speakers, printers, and so on, also may be included.

The various storage 1010, communication device(s) 1012, output devices 1016 and input devices 1014 can be integrated within a housing of the computer, or can be connected through various input/output interface devices on the computer, in which case the reference numbers 1010, 1012, 1014 and 1016 can indicate either the interface for connection to a device or the device itself as the case may be.

An operating system of the computer typically includes computer programs, commonly called drivers, that manage access to the various storage 1010, communication device(s) 1012, output devices 1016 and input devices 1014. Such access generally includes managing inputs from and outputs to these devices. In the case of communication device(s), the operating system also may include one or more computer programs for implementing communication protocols used to communicate information between computers and devices through the communication device(s) 1012.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs may be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

Aspects of Certain Embodiments

In one aspect, a method implemented on a computer system includes, the computer system: for each table of a plurality of database tables and for each column of a plurality of columns within the each table, creating a profile for the each column; establishing a join graph of nodes, wherein each node represents one of the plurality of database tables; for each pair of a plurality of pairs of a first table and a second table from the plurality of database tables, wherein the first table is different than the second table, and for each pair of a plurality of pairs of a first column from the first table and a second column from the second table, calculating a score representative of a predicted level of success in performing a join from the first table on the first column to the second table on the second column, wherein the score is determined based upon the profile for the first column and the profile for the second column, and adding a directed weighted edge to the join graph from a node representing the first table to a node representing the second table, wherein the weight of the added edge is based on the score; receiving a selection of a subset of the plurality of database tables; creating a join tree including a subset of edges in the join graph that spans a subset of nodes in the join graph corresponding to the selected subset of the plurality of database tables; extracting a set of joins represented by the subset of edges; and providing the extracted set of joins as a result.

In one aspect, the method can further include: creating a database query based on the extracted set of joins; and executing the created database query to produce a query result.

In one aspect, the method can be implemented such that creating a profile for the each column includes: processing the each column to create a set of m observables, with m being a positive integer constant greater than one, wherein each observable is a function of a set of elements in the each column, independent of replications, and including the set of m observables in the profile for the each column; and calculating the score includes: combining the set of m observables included in the profile for the first column and the set of m observables included in the profile for the second column to create a combined set of m observables, wherein each observable in the combined set of m observables is a function of a set of elements in a union between the first column and the second column, independent of replications, computing an estimated cardinality of a union between the first column and the second column based on the combined set of m observables without creating a union between the first column and the second column, computing an estimated cardinality of an intersection between the first column and the second column by subtracting the estimated cardinality of the union from the sum of an estimated cardinality of the first column and an estimated cardinality of the second column, and dividing the estimated cardinality of the intersection by the estimated cardinality of the first column.

In one aspect, the method can be implemented such that creating a profile for the each column further includes: computing an estimated cardinality of the each column based on the set of m observables included in the profile for the each column; and including the estimated cardinality of the each column in the profile for the each column.

In one aspect, the method can be implemented such that combining the set of m observables included in the profile for the first column and the set of m observables included in the profile for the second column to create a combined set of m observables includes selecting a maximum of each pair of corresponding observables and including the maximum of each pair in the combined set of m observables.

In one aspect, the method can be implemented such that calculating the score includes: estimating the cardinality of an intersection between the first column and the second column; estimating the cardinality of the first column; and dividing the estimated cardinality of the intersection by the estimated cardinality of the first column.

In one aspect, the method can be implemented such that the profile for the each column further includes a data type.

In one aspect, the method can be implemented such that the score is further based on a comparison between the data type of the first column and the data type of the second column.

In one aspect, the method can be implemented such that the profile for the each column further includes a field name.

In one aspect, the method can be implemented such that the score is further based on a comparison between the field name of the first column and the field name of the second column.

In one aspect, the method can be implemented such that calculating the score includes dividing the cardinality of an intersection between the first column and the second column by the cardinality of the first column.

In one aspect, the method can be implemented such that the adding a directed weighted edge to the join graph is performed in response to determining that the score exceeds a threshold.

In one aspect, the method can be implemented such that the adding a directed weighted edge to the join graph is performed in response to: determining that the join graph does not contain an edge from a node representing the first table to a node representing the second table; or determining that the score exceeds the weight of an existing edge in the join graph from a node representing the first table to a node representing the second table and removing the existing edge from the join graph.

In one aspect, the method can be implemented such that the score is based upon a likelihood of finding a value from the first column in the second column.

In one aspect, the method can be implemented such that the join tree is a maximum spanning tree.

In one aspect, the method can be implemented such that the profile for the each column further includes a density.

In one aspect, the method can be implemented such that calculating the score includes measuring entropy with respect to an intersection between the first column and the second column.

In one aspect, the method can be implemented such that calculating the score includes measuring a similarity between values in the first column and values in the second column.

In one aspect, the method can further include receiving user input specifically directed to a weighted edge in the join graph.

In one aspect, the method can further include modifying a weight of an edge in the join graph based on the received user input.

In one aspect, a computer system includes: at least one storage medium; and at least one processing unit, wherein the at least one storage medium and the at least one processing unit are configured to perform the method of any of the preceding aspects.

In one aspect, a non-transitory computer-readable medium stores instruction code that when executed by a general purpose computer system causes the general purpose computer system to perform the method of any of the preceding aspects.

In one aspect, a computer-implemented process includes: receiving a plurality of data sets, each data set having a plurality of entries, each entry having a plurality of fields, wherein a field in the plurality of fields has at least one value; for each pair of data sets in the plurality of data sets: comparing the values of fields in a first data set in the pair of data sets to the values of fields in a second data set in the pair of data sets to identify fields having substantially similar sets of values, and measuring entropy with respect to an intersection of the sets of values of the identified fields from the pair of data sets; and suggesting fields for a join operation between any pair of data sets in the plurality of data sets, based at least on the measured entropy with respect to the intersection of the sets of values of the identified fields from the pair of data sets.

In one aspect, the computer-implemented process can be implemented such that for each pair of data sets in the plurality of data sets, the process further includes: measuring density of at least one of the identified fields in the pair of data sets; and wherein suggesting fields is further based at least on the measured density.

In one aspect, the computer-implemented process can be implemented such that for each pair of data sets in the plurality of data sets, the process further includes: measuring a likelihood that a value in the identified field in the first data set matches a value in the identified field in the second data set; and wherein suggesting fields is further based at least on the measured likelihood.

In one aspect, the computer-implemented process can be implemented such that for each pair of data sets in the plurality of data sets, the process further includes: measuring a likelihood that a value in the identified field in the first data set matches a value in the identified field in the second data set; and wherein suggesting fields is further based at least on the measured likelihood.

In one aspect, the computer-implemented process can be implemented such that suggesting includes: generating a ranked list of identified fields.

In one aspect, the computer-implemented process can be implemented such that suggesting includes: presenting the ranked list on a display; and receiving an input indicating a selection of identified fields from the ranked list.

In one aspect, the computer-implemented process can be implemented such that suggesting includes: the processor selecting identified fields from the ranked list.

In one aspect, the computer-implemented process can further include: presenting the selected identified fields on a display.

In one aspect, the computer-implemented process can be implemented such that the plurality of data sets includes N data sets, where N is a positive integer greater than 2.

In one aspect, the computer-implemented process can further include: receiving a query results for a query applied to the plurality of data sets; for each data set in the results, performing a join operation using the selected identified fields in the ranked list.

In one aspect, the computer-implemented process can further include: presenting the joined results on a display.

In one aspect, the computer-implemented process can be implemented such that the plurality of data sets includes data from different tables in a relational database management system.

In one aspect, the computer-implemented process can be implemented such that the plurality of data sets includes data from different tables in an object oriented database system.

In one aspect, the computer-implemented process can be implemented such that the plurality of data sets includes data from different tables in an index of documents.

In one aspect, a computer system includes: memory in which a plurality of data sets are stored, each data set having a plurality of entries, each entry having a plurality of fields, wherein a field in the plurality of fields has at least one value;

and one or more processing units programmed by a computer program to be instructed to: for each pair of data sets in the plurality of data sets: compare the values of fields in a first data set in the pair of data sets to the values of fields in a second data set in the pair of data sets to identify fields having substantially similar sets of values, and measure entropy with respect to an intersection of the sets of values of the identified fields from the pair of data sets; and suggest fields for a join operation between any pair of data sets in the plurality of data sets, based at least on the measured entropy with respect to the intersection of the sets of values of the identified fields from the pair of data sets.

In one aspect, the computer system can be implemented such that for each pair of data sets in the plurality of data sets, the one or more processing units are further programmed to be instructed to: measure density of at least one of the identified fields in the pair of data sets; and wherein suggesting fields is further based at least on the measured densities.

In one aspect, the computer system can be implemented such that for each pair of data sets in the plurality of data sets, the one or more processing units are further programmed to be instructed to: measure a likelihood that a value in the identified field in the first data set matches a value in the identified field in the second data set; and wherein suggesting fields is further based at least on the measured likelihood.

In one aspect, the computer system can be implemented such that for each pair of data sets in the plurality of data sets, the one or more processing units are further programmed to be instructed to: measure a likelihood that a value in the identified field in the first data set matches a value in the identified field in the second data set; and wherein suggesting fields is further based at least on the measured likelihood.

In one aspect, the computer system can be implemented such that suggesting includes: generating a ranked list of identified fields.

In one aspect, the computer system can be implemented such that suggesting includes: presenting the ranked list on a display; and receiving an input indicating a selection of identified fields from the ranked list.

In one aspect, a device includes: means for, for each table of a plurality of database tables and for each column of a plurality of columns within the each table, creating a profile for the each column; means for establishing a join graph of nodes, wherein each node represents one of the plurality of database tables; means for, for each pair of a plurality of pairs of a first table and a second table from the plurality of database tables, wherein the first table is different than the second table, and for each pair of a plurality of pairs of a first column from the first table and a second column from the second table, calculating a score representative of a predicted level of success in performing a join from the first table on the first column to the second table on the second column, wherein the score is determined based upon the profile for the first column and the profile for the second column, and adding a directed weighted edge to the join graph from a node representing the first table to a node representing the second table, wherein the weight of the added edge is based on the score; means for receiving a selection of a subset of the plurality of database tables; means for creating a join tree comprising a subset of edges in the join graph that spans a subset of nodes in the join graph corresponding to the selected subset of the plurality of database tables; means for extracting a set of joins represented by the subset of edges; and means for providing the extracted set of joins as a result.

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow. It should be understood that the subject matter defined in the appended claims is not necessarily limited to the specific implementations described above. The specific implementations described above are disclosed as examples only.

What is claimed is:

1. A method implemented on a computer system comprising a processor and a memory, the method comprising, the computer system:

for each table of a plurality of database tables and for each column of a plurality of columns within the each table:
   determining a data type for the each column by accessing and analyzing a subset of values stored in the each column,
   determining a cardinality of the each column, and
   storing a profile for the each column, wherein the profile for the each column includes the determined data type and the determined cardinality;

establishing a join graph comprising a plurality of nodes, wherein each node of the plurality of nodes represents one of the plurality of database tables;

for each pair of a plurality of pairs of a first table and a second table from the plurality of database tables:
   for each pair of at least one pair of a first column from the first table and a second column from the second table:
      comparing the data type included in the profile for the first column with the data type included in the profile for the second column,
      determining that the data type included in the profile for the first column matches the data type included in the profile for the second column,
      calculating a joinability score based upon the profile for the first column and the profile for the second column, wherein calculating the joinability score comprises:
         retrieving the determined cardinality of the first column from the stored profile for the first column,
         retrieving the determined cardinality of the second column from the stored profile for the second column,
         determining a cardinality of a union between the first column and the second column,
         determining a cardinality of an intersection between the first column and the second column by subtracting the determined cardinality of the union from the sum of the determined cardinality of the first column and the determined cardinality of the second column, and
         dividing the determined cardinality of the intersection by the determined cardinality of the first column, and
      adding a directed weighted edge to the join graph from a node representing the first table to a node representing the second table, wherein the weight of the added edge is based on the joinability score;

receiving a selection of a subset of the plurality of database tables;

creating a join tree comprising a maximum weight subset of edges in the join graph that spans a subset of nodes in the join graph corresponding to the selected subset of the plurality of database tables;

extracting a set of joins represented by the subset of edges;

creating a database query based on the extracted set of joins; and executing the created database query to produce a query result.

2. The method of claim 1, wherein for each instance of determining a cardinality, the determining is performed by at least one of calculating an estimated cardinality and calculating an exact cardinality.

3. The method of claim 2, further comprising, for each table of the plurality of database tables and for each column of the plurality of columns within the each table:

processing the each column to create a set of m observables, with m being a positive integer constant greater than one, wherein each observable is a function of a set of elements in the each column, independent of replications;

including the set of m observables in the stored profile for the each column; and using the set of m observables in calculating an estimated cardinality of the each column.

4. The method of claim 3, wherein determining a cardinality of an intersection between the first column and the second column comprises:

combining the set of m observables included in the profile for the first column and the set of m observables included in the profile for the second column to create a combined set of m observables, wherein each observable in the combined set of m observables is a function of a set of elements in a union between the first column and the second column, independent of replications;

computing an estimated cardinality of a union between the first column and the second column based on the combined set of m observables without creating a union between the first column and the second column, subtracting the estimated cardinality of the union from the sum of the estimated cardinality of the first column and the estimated cardinality of the second column.

5. The method of claim 4, wherein combining the set of m observables included in the profile for the first column and the set of m observables included in the profile for the second column to create a combined set of m observables comprises selecting a maximum of each pair of corresponding observables and including the maximum of each pair in the combined set of m observables.

6. The method of claim 1, wherein the profile for the each column further comprises a field name, and wherein the joinability score is further based on a comparison between the field name of the first column and the field name of the second column.

7. The method of claim 1, further comprising for the each column of a plurality of columns within the each table, determining that a density of the each column exceeds a minimum density.

8. The method of claim 1, wherein the adding a directed weighted edge to the join graph is performed in response to determining that the joinability score exceeds a threshold.

9. The method of claim 1, further comprising modifying the weight of an edge in the join graph based on received user input.

10. The method of claim 1, further comprising manually adding a directed weighted edge to the join graph based on received user input.

11. The method of claim 1, wherein the joinability score represents an estimation-based statistical likelihood that values in the first column match values in the second column.

12. The method of claim 1, wherein the adding a directed weighted edge to the join graph is performed in response to, for one pair of a first column from the first table and a second column from the second table, determining that the one pair has a maximum joinability score of a plurality of pairs of a first column from the first table and a second column from the second table.

13. A computer system comprising:

at least one storage medium storing instruction code; and at least one processing unit configured to execute the instruction code to perform a method comprising:

for each table of a plurality of database tables and for each column of a plurality of columns within the each table:

determining a data type for the each column by accessing and analyzing a subset of values stored in the each column, determining a cardinality of the each column, and storing a profile for the each column, wherein the profile for the each column includes the determined data type and the determined cardinality;

establishing a join graph comprising a plurality of nodes, wherein each node of the plurality of nodes represents one of the plurality of database tables;

for each pair of a plurality of pairs of a first table and a second table from the plurality of database tables:

for each pair of at least one pair of a first column from the first table and a second column from the second table:

comparing the data type included in the profile for the first column with the data type included in the profile for the second column, determining that the data type included in the profile for the first column matches the data type included in the profile for the second column, calculating a joinability score based upon the profile for the first column and the profile for the second column, wherein calculating the joinability score comprises:

retrieving the determined cardinality of the first column from the stored profile for the first column, retrieving the determined cardinality of the second column from the stored profile for the second column, determining a cardinality of a union between the first column and the second column, determining a cardinality of an intersection between the first column and the second column by subtracting the determined cardinality of the union from the sum of the determined cardinality of the first column and the determined cardinality of the second column, and dividing the determined cardinality of the intersection by the determined cardinality of the first column, and adding a directed weighted edge to the join graph from a node representing the first table to a node representing the second table, wherein the weight of the added edge is based on the joinability score;

receiving a selection of a subset of the plurality of database tables;
creating a join tree comprising a maximum weight subset of edges in the join graph that spans a subset of nodes in the join graph corresponding to the selected subset of the plurality of database tables;
extracting a set of joins represented by the subset of edges;
creating a database query based on the extracted set of joins; and
executing the created database query to produce a query result.

14. The computer system of claim 13, wherein for each instance of determining a cardinality, the determining is performed by at least one of calculating an estimated cardinality and calculating an exact cardinality.

15. The computer system of claim 14, wherein the method further comprises, for each table of the plurality of database tables and for each column of the plurality of columns within the each table:
processing the each column to create a set of m observables, with m being a positive integer constant greater than one, wherein each observable is a function of a set of elements in the each column, independent of replications;
including the set of m observables in the stored profile for the each column; and
using the set of m observables in calculating an estimated cardinality of the each column.

16. The computer system of claim 13, wherein the adding a directed weighted edge to the join graph is performed in response to, for one pair of a first column from the first table and a second column from the second table, determining that the one pair has a maximum joinability score of a plurality of pairs of a first column from the first table and a second column from the second table.

17. A non-transitory computer-readable medium storing instruction code that when executed by a general purpose computer system causes the general purpose computer system to perform a method comprising:
for each table of a plurality of database tables and for each column of a plurality of columns within the each table:
determining a data type for the each column by accessing and analyzing a subset of values stored in the each column,
determining a cardinality of the each column, and
storing a profile for the each column, wherein the profile for the each column includes the determined data type and the determined cardinality;
establishing a join graph comprising a plurality of nodes, wherein each node of the plurality of nodes represents one of the plurality of database tables;
for each pair of a plurality of pairs of a first table and a second table from the plurality of database tables:
for each pair of at least one pair of a first column from the first table and a second column from the second table:
comparing the data type included in the profile for the first column with the data type included in the profile for the second column,
determining that the data type included in the profile for the first column matches the data type included in the profile for the second column,
calculating a joinability score based upon the profile for the first column and the profile for the second column, wherein calculating the joinability score comprises:
retrieving the determined cardinality of the first column from the stored profile for the first column,
retrieving the determined cardinality of the second column from the stored profile for the second column,
determining a cardinality of a union between the first column and the second column,
determining a cardinality of an intersection between the first column and the second column by subtracting the determined cardinality of the union from the sum of the determined cardinality of the first column and the determined cardinality of the second column, and
dividing the determined cardinality of the intersection by the determined cardinality of the first column, and
adding a directed weighted edge to the join graph from a node representing the first table to a node representing the second table, wherein the weight of the added edge is based on the joinability score;
receiving a selection of a subset of the plurality of database tables;
creating a join tree comprising a maximum weight subset of edges in the join graph that spans a subset of nodes in the join graph corresponding to the selected subset of the plurality of database tables;
extracting a set of joins represented by the subset of edges;
creating a database query based on the extracted set of joins; and
executing the created database query to produce a query result.

18. The computer-readable medium of claim 17, wherein for each instance of determining a cardinality, the determining is performed by at least one of calculating an estimated cardinality and calculating an exact cardinality.

19. The computer-readable medium of claim 18, wherein the method further comprises, for each table of the plurality of database tables and for each column of the plurality of columns within the each table:
processing the each column to create a set of m observables, with m being a positive integer constant greater than one, wherein each observable is a function of a set of elements in the each column, independent of replications;
including the set of m observables in the stored profile for the each column; and
using the set of m observables in calculating an estimated cardinality of the each column.

20. The computer-readable medium of claim 17, wherein the adding a directed weighted edge to the join graph is performed in response to, for one pair of a first column from the first table and a second column from the second table, determining that the one pair has a maximum joinability score of a plurality of pairs of a first column from the first table and a second column from the second table.

* * * * *